United States Patent [19]

Hill

[11] 4,218,249

[45] Aug. 19, 1980

[54] WATER-REPELLENT AQUEOUS WOOD-TREATING SOLUTIONS

[75] Inventor: Robert E. Hill, Webster Groves, Mo.

[73] Assignee: Koppers Company, Inc., Pittsburgh, Pa.

[21] Appl. No.: 55,894

[22] Filed: Jul. 9, 1979

[51] Int. Cl.$^2$ .............................................. C09K 3/18
[52] U.S. Cl. ................................ 106/2; 106/15.05; 424/137; 424/140; 424/154; 427/440
[58] Field of Search ................. 106/2, 15.05, 18.26, 106/18.28; 424/137, 140, 154; 427/440

[56] References Cited

U.S. PATENT DOCUMENTS

| 2,408,978 | 10/1946 | Hager | 424/137 |
| 2,432,007 | 12/1947 | Hager | 424/137 |
| 2,565,175 | 8/1951 | Hager | 424/137 |

*Primary Examiner*—Lorenzo B. Hayes
*Attorney, Agent, or Firm*—Donald M. MacKay

[57] ABSTRACT

Aqueous wood- and paper-treating solutions are provided of hexavalent chromium and, optionally, copper or copper-arsenic mixtures with aluminum halohydrates in an acid medium which provide increased water repellency.

11 Claims, No Drawings

WATER-REPELLENT AQUEOUS WOOD-TREATING SOLUTIONS

SUMMARY OF THE INVENTION

The present invention is related to solutions that provide increased water repellency for wood and other cellulose products. More particularly, the invention is related to aqueous cellulose-treating solutions of hexavalent chromium and, optionally, copper or copper-arsenic mixtures with aluminum halohydrates in an acid medium. In accordance with the invention it has been discovered that when aluminum halohydrates are incorporated into a solution of hexavalent chromium and, optionally, copper or copper-arsenic mixtures, a superior wood-treating solution is produced. The solution can be used to treat paper, cardboard, and cellulose products generally, but for convenience, the disclosure describes the treatment of wood.

Copper, chromium and arsenic can be supplied to the solution by compounds such as those contained in aqueous wood-preserving solutions known as Acid Copper Chromate (ACC) and Chromated Copper Arsenate (CCA). Compounds are preferably selected, however, that will not release more than trace amounts of sulfate ions in the aqueous wood-treating solution. Suitable compounds include basic copper carbonate, copper sulfamate, copper nitrate, copper fluosilicate, copper fluoborate, cupric oxide or hydroxide, potassium or sodium dichromate, chromium trioxide, arsenic pentoxide, arsenic acid, sodium arsenate or pyroarsenate. Sulfate ions are undesirable because the aluminum halohydrate is incompatible with an aqueous solution containing more than a trace or minor amount of sulfate ion and tends to precipitate out of solution.

To insure the solubility of the aluminum halohydrate in the aqueous solution, the amount of chromium, copper and arsenic on an oxide basis should not exceed about 45 weight percent of the solution. The lower limit, however, can be as small as about 0.5 but is preferably between about 0.8 and about 14 percent by weight. The amount of aluminum halohydrate employed will depend upon the concentration of oxides of copper, chromium and arsenic, but generally from about 0.5 and about 25 percent aluminum halohydrate is employed and preferably from about 0.7 to about 6 percent by weight of the solution. For best results, the amount of oxides of copper, chromium and arsenic present in the solution is determined by the standards promulgated by the American Wood Preservers Association in standard no. P5-77 for acid copper chromate and chromated copper arsenate solutions.

Aluminum halohydrates which can be employed include aluminum chlorohydrate, aluminum iodohydrate, aluminum bromohydrate and aluminum fluorohydrate.

DETAILED DESCRIPTION OF THE INVENTION

Depending on the compounds employed, it may be necessary to add a strong acid in order to solubilize the components of ACC and CCA Type B solutions and may, in addition, be employed to provide the desired pH for the final solution. Generally, the pH must be between about 0.1 and about 5.0, and is preferably between about 1.2 and 4.3. Typical acids that can be employed to provide the desired pH include sulfamic acid, nitric acid, fluorosilicic acid, fluoroboric acid or a mixture of any of these acids with a minor amount of about 2 percent of phosphoric acid. In order to prepare the solutions of the invention, it is preferred that the compounds added to form the oxides and/or aluminum halohydrate be diluted before mixing as the use of concentrated solutions tends to inhibit the solubilization of the components. Generally it is sufficient to dilute the additive mixtures to about 0.5 to 14 percent oxides containing 0.7 to 6 percent aluminum halohydrate.

The aluminum halohydrates useful in the invention can be represented by the formula: $Al_x(OH)_yX_z$, wherein X is a halogen such as chlorine, bromine, fluorine or iodine and x and y are integers of from 1 to 4 and z is an integer of from 5 to 1. The aluminum halohydrates are usually polymeric in nature and thus the above formula should not be considered restrictive. Typical non-limiting examples of the aluminum halohydrate that can be used in the present invention are: $Al_3OH_5Cl_4$, $Al_4OH_{10}Cl_2$, $Al_4OH_9Cl_3$ and $Al_2OH_4Cl_2$.

Any method of treating wood with aqueous treating solutions can be used when wood is treated with the aqueous wood-treating solutions of the present invention. These methods include treating wood by injection of the aqueous wood-treating solution under pressure in closed vessels or dipping in open vessels or by brush or spray painting of the solution. Also, in the method of treating wood with the aqueous wood-treating solution of the present invention, the wood may be end-sealed in any manner known to those skilled in the art to enhance the water repellent effect of the aqueous wood-treating solution.

The following description is directed to several alternative embodiments of the aqueous wood-treating solution of the present invention. In these embodiments the preferred aluminum halohydrate used is aluminum chlorohydrate in a 50 percent aqueous solution. Nonlimiting examples of such solutions that are commercially available are Wickenol 303 solution, Wickenol 305 solution, and Wickenol 306 solution, all available from Wickhen Products Inc., Huguenot, New York. The Wickenol 303 solution is an aqueous 50 percent aluminum chlorohydrate which has an atomic ratio of two aluminum atoms to one chlorine atom.

For non drug use, Wickenol 303 is now known as Wicklor 904—Al complex 56,

Wicklor 305 is now known as Wicklor 906—Al complex 23, and

Wickenol 306 is now known as Wicklor 905—Al complex 34.

Other products which have ratios of one aluminum atom to one chlorine atom and intermediate ratios between one and two aluminum atoms to one chlorine atom may also be used. The diluted Wickenol solutions did not appear to exhibit high inherent water repellency when applied to wood by itself, but when used in the aqueous wood-treating solutions of the present invention a synergistic effect is obtained, resulting in an increased water repellency in treated wood.

The following examples will serve to illustrate preferred embodiments of the invention. All parts and percentages in said examples and elsewhere in the specification and claims are by weight unless otherwise specified.

EXAMPLES

The following solutions were prepared.

| CCA TYPE A Ingredients | Percent by Wt. | Percent Oxides | |
|---|---|---|---|
| Chromium trioxide | 23.75 | 23.75 | $CrO_3$ |
| Technical sodium dichromate dihydrate | 13.41 | 9.00 | $CrO_3$ |
| Basic cupric carbonate (55.8% Cu) | 12.96 | 9.05 | CuO |
| 73% Aqueous arsenic acid | 13.87 | 8.20 | $As_2O_5$ |
| Deionized water | 36.01 | | |
| | 100.00% | 50.00% | |

| CCA TYPE B Ingredients | Percent by Wt. | Percent Oxides | |
|---|---|---|---|
| Chromium trioxide | 14.12 | 14.12 | $CrO_3$ |
| Basic cupric carbonate (55.8% Cu) | 11.22 | 7.84 | CuO |
| 75% Aqueous arsenic acid | 29.71 | 18.04 | $As_2O_5$ |
| Technical sulfamic acid | 5.00 | | |
| Deionized water | 39.95 | | |
| | 100.00% | 40.00% | |

Sulfamic acid was added to the solution to prevent the arsenic acid from reacting with part of the copper oxide.

| CCA TYPE C Ingredients | Percent by Wt. | Percent Oxides |
|---|---|---|
| Chromium trioxide | 23.75 | 23.75 $CrO_3$ |
| Cupric oxide | 9.25 | 9.25 CuO |
| Arsenic pentoxide | 17.00 | 17.00 $As_2O_5$ |
| Deionized water | 50.00 | |
| | 100.00% | 50.00% |

The three solutions alone and with 3 percent of a Wickenol aluminum chlorohydrate were used to treat southern pine sapwood wafers to assess water repellency. The wafers were vacuum treated with the solution, allowed to air dry and conditioned at 65±5 percent relative humidity and 75°–80° F. for ten days, whereupon the water repellencies were determined by 30 minute immersion in deionized water at room temperature by the general procedure of the National Wood Manufacturers Association swellometer test. The results are shown in the following table.

TABLE I

| | Water Repellency Efficiency Based on Reduction of: | | | | | |
|---|---|---|---|---|---|---|
| Aqueous Treating Solutions | Tangential Swell | | | Water Absorption | | |
| | (A) | (B) | (C) | (A) | (B) | (C) |
| 1. 1% Oxide CCA-A alone | 54 ± 4 | 47 | | 72 ± 2 | 65 | |
| 2. #1 Including 3% w/w Wickenol(D) 303 | 65 (A) 3 | 73 | | 75 ± 6 | 78 | |
| 3. #1 Including 3% w/w Wickenol 305 | 68 ± 2 | 75 | | 79 ± 0 | 72 | |
| 4. #1 Including 3% w/w Wickenol 306 | 72 ± 1 | 74 | | 82 ± 0 | 75 | |
| 5. 1% Oxide CCA-B (C) 7 ± 2 | 4 | | −22 ± 0 | −20 | | |
| 6. #5 Including 3% w/w (D) 56 ± 1 | 66 | | 72 ± 2 | 72 | | |
| 7. #5 Including 3% w/w Wickenol 305 | 43 ± 1 | 50 | | 60 ± 1 | 51 | |
| 8. #5 Including 3% w/w Wickenol 306 | 50 ± 1 | 63 | | 68 ± 2 | 65 | |
| 9. 0.8% Oxide CCA-C alone | | | 0 | | | −14 |
| 10. #9 Including 3% Wickenol 303 | | | 47 ± 1 | | | 58 ± 1 |
| 11. #9 Including 3% Wickenol 306 | | | 21 ± 4 | | | 37 ± 2 |
| 12. 1.6% Wickenol 303 | | | −1 | | | −14 |
| 13. 1.6% Wickenol 306 | | | −1 | | | −10 |

(A) Indicates wafers from boards with 36.5 pcf density at 11–12% M.C. (moisture content) used in duplicates treated to about 37.5 pcf of solution.
(B) Indicates single wafers from boards with 37.2 pcf density at 11–12% M.C. treated to about 42 pcf of solution.
(C) Indicates single wafers from boards with 38.5 pcf density at 11% M.C. treated to about 38.39 pcf of solution.
(D) Wickenol is a trade name for Aluminum Chlorohydrate.

From the data it can be seen that the water repellency is considerably increased with the compositions of the invention as compared with a standard type solution or one with an aluminum halohydrate alone.

An additional unexpected property imparted to the dilutions from CCA Type C 50% oxide liquid concentrate by the addition of the aluminum halohydrates is that compatible mixtures inhibit the formation of insoluble green sludge when in contact with wood, especially at the 1 to 2 percent oxide level normally used in timber treating. Tests were initiated in which four Douglas fir heartwood blocks, each ¾"×1.5" were placed in 8 oz. cylindrical bottles with their long axes vertical. Aqueous test dilutions were added to float the blocks but were kept immersed by the constriction in the bottles below the screw caps as the bottles were completely filled. The tightly capped test units were kept at 80° F. The results of observations from preparation, at which time all test dilutions were of a transparent yellow orange color, are tabulated below.

| Percent by Weight in Water CCA-C Oxides Wickenol Type C | Initial pH Values | Initial Observations of Solutions After: | |
|---|---|---|---|
| | | 1 Week | 7 Months |
| 1. 1.0 3.0% W-303 | 3.7 | Stable | Clear green solution |
| 2. 2.0 5.0% W-303 | 3.5 | Stable | Dark green solution |
| 3. 1.0 1.0% W-306 | 3.4 | Stable | Clear green solution |
| 4. 1.0 2.0% W-306 | 3.5 | Stable | Clear green solution |
| 5. 1.0 3.0% W-305 | 3.4 | Stable | Clear green solution |
| 6. 2.0 5.0% W-305 | 3.2 | Stable | Dark green solution |
| 7. 1.0 None | 1.9 | Unstable | Weak blue solution |
| 8. 2.0 None | 1.7 | Unstable | Cloudy green amber solution |

The yellow orange dilution of 1.0 and 2.0% CCA alone became cloudy after three days in contact with the wood and visible light green precipitates were evident after one week covering the bottom of the containers. After seven months the precipitate covered the top surfaces and sides of the Douglas fir blocks as well as the bottom of the bottles in tests number 7 and 8. No visible precipitate was noted on the remaining test blocks or green precipitates on the bottom of the containers up to seven months in tests number 1 through 6.

The tests were repeated using 1 percent CCA Type C oxides alone and with 3 percent of Wickenol 303, 305 and 306, but at 140° F. The 1 percent oxides alone was found to be unstable after overnight heating to form a green precipitate on the top and edges of the wooden blocks. The remaining tests solutions remained stable with a brown amber color at the end of the 72-hour test period at 140° F.

The action of the aluminum halohydrate appears to be solubilization of the sludge as it is formed by the reduction of hexavalent chromium in contact with the wood.

Similar tests were performed with an ACC type solution of the following composition.

| Ingredients | Weight Percent | Weight Percent of Oxide |
| --- | --- | --- |
| Chromium trioxide | 27.5 | 27.3 $CuO_3$ |
| Basic cupric carbonate | 18.1 | 12.7 CuO |
| Sulfamic acid | 7.4 | |
| Deionized water | 47.0 | |
| | 100.0% | 40.0% |

Aqueous solutions of 5 percent or 2 percent oxide concentrations alone and with the inclusion of varying amounts of aluminum chlorohydrate were used for the swellometer test. The southern pine sapwood wafers with a 42.2 pcf density at 11–12 percent M.C. took up an average of 38.9 pcf of solution on vacuum treating at room temperature. A ten-minute vacuum near 28 inches of Hg was impressed on the wafers, followed by filling at room temperature and ten additional minutes of wafer immersion at ambient conditions. Water repellency data was then obtained on 30-minute water immersion using the vacuum treated wafers after seven days of air drying.

TABLE II

| Ingredients | Reduction of Tangential Swell | Water Absorption |
| --- | --- | --- |
| 1. ACC Type at 2% oxides alone | 32 ± 2 | 30 ± 5 |
| 2. No. 1 plus 1.6% Wickenol 303 | 80 ± 0 | 75 ± 2 |
| 3. No. 1 plus 16% Wickenol 303 | 68 ± 2 | 58 ± 2 |
| 4. No. 1 plus 32% Wickenol 303 | 35 ± 1 | 0 ± 4 |

From the data reported in the table it can be seen that compositions of the invention are considerably superior to the ACC type solution alone.

Solutions of 5.08% sodium dichromate dihydrate (3.41% $CrO_3$) and 3.41 percent chromium trioxide (3.41% $CrO_3$) were tested alone and with 3 percent of several different aluminum chlorohydrates. Solutions 1–4 reported below were used to treat southern pine sapwood wafers, and solutions 5–8 were used to treat Ponderosa pine sapwood wafers. The improvement in reduction of tangential swell for the chromium-aluminum chlorohydrate solutions was from about 2 to many times as shown in the following Table III.

TABLE III

| Solution | Percent Efficiency in Reduction of: | |
| --- | --- | --- |
| | Tangential Swell | Water Absorption |
| 1. 5.08% Sodium dichromate dihydrate | 6 ± 1 | −41 |
| 2. #1 Including 3% Wickenol 303 | 37 ± 3 | 49 ± 1 |
| 3. #1 Including 3% Wickenol 306 | 54 ± 1 | 61 ± 1 |
| 4. #1 Including 3% Wickenol 305 | 65 ± 1 | 68 ± 1 |
| 5. 3.41% Chromium trioxide | 6 ± 1 | 59 ± 1 |
| 6. #5 Including 3% Wickenol 303 | 15 ± 1 | 66 ± 1 |
| 7. #5 Including 3% Wickenol 306 | 14 ± 1 | 56 ± 1 |
| 8. #5 Including 3% Wickenol 305 | 12 ± 1 | 54 ± 1 |

While the invention has been illustrated by several preferred embodiments, it will be obvious to one of ordinary skill that numerous variations can be made without departing from the scope of the invention and, accordingly, the invention is intended to be limited only by the appended claims.

What is claimed:

1. An aqueous solution for providing increased water repellency to cellulose comprising an aqueous acid medium having disolved therein an aluminum halohydrate and oxides of hexavalent chromium and, optionally, copper and copper-arsenic mixtures.

2. The solution of claim 1 wherein the oxides are present in an amount from between about 0.5 and about 45 percent by weight of the solution.

3. The solution of claim 1 wherein the oxides are present in an amount from about 0.8 and 14 percent by weight of the solution.

4. The solution of claim 1 wherein the aluminum halohydrate is aluminum chlorohydrate.

5. The solution of claim 1 wherein the aluminum halohydrate is present in an amount from between about 0.5 and about 25.0 percent by weight of the solution.

6. The solution of claim 1 wherein the aluminum halohydrate is present in an amount from about 0.7 to about 6 percent by weight of the solution.

7. The solution of claim 1 wherein the pH is from about 0.1 and 5.0.

8. The solution of claim 4 containing oxides of chromium, copper and arsenic.

9. The solution of claim 4 containing oxides of chromium and copper.

10. The solution of claim 4 containing chromium oxide.

11. A method for increasing the water repellency of cellulose comprising treating the cellulose with an effective amount of an aqueous acid medium having dissolved therein an aluminum halohydrate and oxides of hexavalent chromium and, optionally, copper and copper-arsenic mixtures.

* * * * *